United States Patent [19]

Kunimune et al.

[11] Patent Number: 4,672,099
[45] Date of Patent: Jun. 9, 1987

[54] SOLUBLE POLYIMIDE-SILOXANE PRECURSOR, PROCESS FOR PRODUCING SAME AND CROSS-LINKED POLYIMIDE-SILOXANE

[75] Inventors: Kouichi Kunimune, Ichiharashi; Yoshiya Kutsuzawa, Yokohamashi; Shiro Konotsune, Yokosukashi, all of Japan

[73] Assignee: Chisso Corporation, Osaka, Japan

[21] Appl. No.: 833,712

[22] Filed: Feb. 27, 1986

[30] Foreign Application Priority Data

Mar. 11, 1985 [JP] Japan ............................ 60-47865

[51] Int. Cl.$^4$ ............................................. C08G 77/04
[52] U.S. Cl. ..................................... 528/26; 525/431; 528/28
[58] Field of Search ............... 528/26, 28; 525/431

[56] References Cited

U.S. PATENT DOCUMENTS

| | | | |
|---|---|---|---|
| 3,926,911 | 12/1975 | Greber et al. | 260/46.5 E |
| 3,950,308 | 4/1976 | Greber et al. | 260/46.5 E |
| 4,520,075 | 5/1985 | Igarashi et al. | 528/26 |
| 4,522,985 | 6/1985 | Ryang | 528/26 |

FOREIGN PATENT DOCUMENTS

| | | |
|---|---|---|
| 7473 | 1/1983 | Japan . |
| 13631 | 1/1983 | Japan . |
| 108627 | 5/1986 | Japan . |

Primary Examiner—Melvyn I. Marquis
Attorney, Agent, or Firm—Wenderoth, Lind & Ponack

[57] ABSTRACT

A novel soluble polyimide-siloxane precursor having a good storage stability in solution and forming a superior coating on silicon wafer, glass, etc. under heating conditions of low temperature and short time; a process for producing the same; and a cross-linked polyimidesiloxane obtained by heating the above precursor are provided, which precursor has an imide-amic acid chain part expressed by the formula (1)

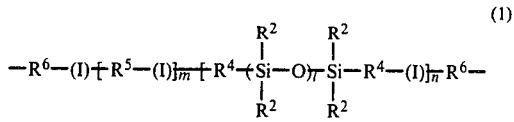

bonded by a bonding structure expressed by the formula (5)

$$-SiR^7{}_{3-k}Y^1{}_{k-1}-O-SiR^7{}_{3-k}Y^1{}_{k-1}- \quad (5)$$

wherein each I, in a total number of m+n+1, represents independently any one of constituting units expressed by the following formulas (2), (3) and (4):

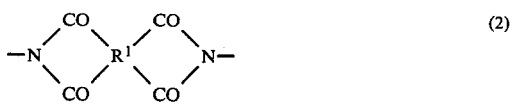

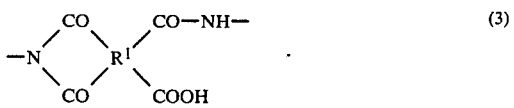

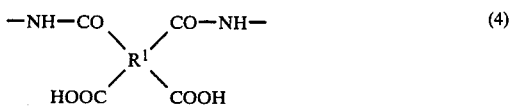

wherein $R^1$ represents a tetravalent carbocyclic aromatic group; $R^2$, $R^4$, $R^5$, $R^6$, $R^7$ and $Y^1$ each are a specified group; l is 1 to 100; m is 0 or an integer; n is an integer; and $1 \leq k \leq 3$, and which process comprises a first step of reacting a tetracarboxylic acid dianhydride, a diaminosiloxane, a diamine and an aminosilicon compound, each specified, in a solvent under specified conditions, and a second step of heating the resulting reaction solution in the presence of a silylating agent under specified reaction conditions.

5 Claims, 1 Drawing Figure

SOLUBLE POLYIMIDE-SILOXANE PRECURSOR, PROCESS FOR PRODUCING SAME AND CROSS-LINKED POLYIMIDE-SILOXANE

BACKGROUND OF THE INVENTION

This invention relates to a novel polyimide-siloxane precursor, a process for producing the same, and a cross-linked polyimide-siloxane.

Polyimide resins have so far been widely used for protecting materials, insulating materials and adhesives in the field of electronic equipment or films, structural materials, etc., mainly in the aspect of heat resistance. The process of using the resins has relied, in most cases, on a process of applying a precursor prior to forming a cyclized polymer, as it is, onto an object, followed by baking to thereby complete imidization and also effect cross-linking, and various proposals have been made for improving the functions and effects after baking suitable to the above-mentioned various uses. Such prior art, however, cannot always be said to sufficiently satisfy current diversified, indivisualized and sophisticated needs.

For example, polyamic acids which have so far been used for a polyimide precursor for electronic materials have been applied in the form of their solution on a substrate, followed by baking to effect imidization and curing, but at the time of their use, various problems have been raised such that baking requires as high a temperature as 300°–400° C. which often exceeds the heat-resistant temperature of the substrates; and adhesion of the coating solution onto silicon wafer, glass, etc. is insufficient; etc.

As to such adhesion among these problems, a number of copolymers of polyamic acid with silicon compounds have been proposed for improving the adhesion. For example, Japanese patent application laid-open Nos. Sho 57-143328/1982, Sho 58-7473/1983 and Sho 58-13631/1983 propose a technique that a polyimide precursor obtained by replacing a portion of a diamine component as raw material by a polysiloxane terminated with diamines at both the ends thereof is used to prepare a polyimide-siloxane copolymer. In this case, however, a problem has been raised that in place of improving the adhesion to a certain extent, the polymerization degree decreases with the increase of the siloxane content in the resulting copolymer to lower the coating-formability.

Further, Japanese patent publication Nos. Sho 58-32162/1983 and Sho 58-32163/1983 disclose a process wherein a suitable carboxylic acid derivative such as a tetracarboxylic acid dianhydride is reacted with a diamine, to form a polyamidecarboxylic acid having a terminal group such as acid anhydride. This polyamidecarboxylic acid is reacted with an aminosilicon compound at −20° C. to +50° C., to obtain a silicon-containing polyamidecarboxylic acid prepolymer (a precursor), which is not imidized or imidized (chemically cyclized) under mild conditions (low temperature, preferably 50° C. or lower, particularly −20° C. to +25° C.) in the presence of a dehydrating agent to form an organic silicon-modified polyimide precursor. The former unimidized precursor or the latter polyimide precursor is heated in the form of a solution in the presence or absence of a silane diol or a siloxane diol to effect completion of imidization and also cross-linking, to thereby obtain a polyimide-siloxane precursor. However, this polyimide-siloxane precursor has raised various problems that in the case where it is not cyclized, it requires baking at a high temperature of about 200° C. or higher, up to 350° C. for imidizing it after coating as in the case of conventional polyimide precursor composed mainly of polyamidecarboxylic acid; if the resulting cyclized substance has a high silicon content, the coating formability is inferior, while if it has a low silicon content, adhesion onto silicon wafer, glass, etc. is inferior; and in the case where a pre-cyclized (preimidized) polyimide-siloxane precursor is prepared, cyclization by low temperature treatment in the presence of a dehydrating agent is carried out, but this requires a long time and hence is not practical, while if cyclization is promoted by heating, the whole solution gels to lose fluidity.

Further, the present inventors have previously proposed a soluble polyimide-siloxane precursor using a tetracarboxylic acid dianhydride, a diamine, an aminosilicon compound and a silylating agent as raw materials which are in part the same as those used in the present invention (Japanese patent application No. Sho 59-230428/1984). This precursor has superior, practical characteristics, but on the other hand, it has a drawback of being somewhat inferior in storage stability.

In view of the above various problems of the prior art, it has been desired to develop a precursor which is soluble in a suitable solvent; has a suitable viscosity in the form of a solution to afford good operability; can be baked and cured at a relatively low temperature and for a relatively short time; has a good coating-formability; has a superior storage stability; and has superior adhesion onto silicon wafer, glass, etc., so that the resulting solution may be suitable for surface-protection of semiconductors, insulating film between multilayer interconnections, etc.

The object of the present invention is to provide such a soluble polyimide-siloxane precursor which overcomes the above problems (in a first aspect), a process for producing the same (in a second aspect), and a cross-linked polyimide-siloxane (in a third aspect).

SUMMARY OF THE INVENTION

The present invention in a first aspect resides in:
a soluble polyimide-siloxane precursor having an imide-amic acid chain part expressed by the formula (1)

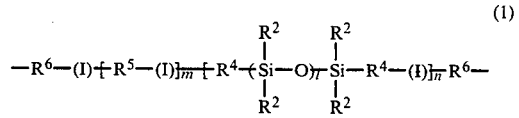

bonded by a bonding structure expressed by the formula (5)

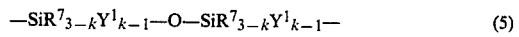

wherein each I, in a total number of m+n+l, represents independently any one of constituting units expressed by the following formulas (2), (3) and (4):

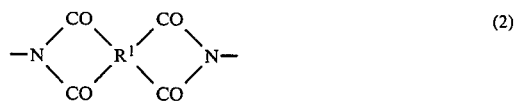

-continued

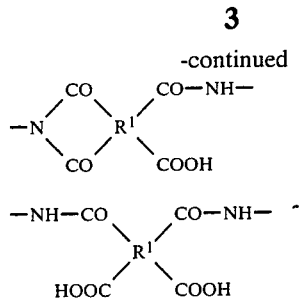

wherein $PR^1$ represents independently a tetravalent carbocyclic aromatic group;

each $R^2$ represents independently an alkyl group of 1 to 6 carbon atoms, phenyl group or an alkyl-substituted phenyl group of 7 to 12 carbon atoms;

each $R^4$ and each $R^6$ represents independently $-(CH_2)_s$,

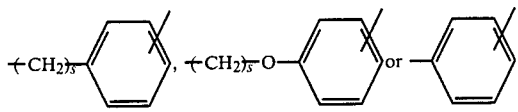

wherein s represents an integer of 1 to 4;

$R^5$ represents an aliphatic group of 2 to 12 carbon atoms, an alicyclic group of 4 to 30 carbon atoms, an aromatic aliphatic group of 6 to 30 carbon atoms or a carbocyclic aromatic group of 6 to 30 carbon atoms;

l represents an integer of 1 to 100;

m represents zero or a positive integer;

n represents a positive integer;

each $R^7$ represents independently an alkyl group of 1 to 6 carbon atoms, phenyl group or an alkyl-substituted phenyl group of 7 to 12 carbon atoms;

each $Y^1$ represents independently an alkoxy group, acetoxy group, a halogen atom, hydroxyl group, $(-O-)_{\frac{1}{2}}$ or a group expressed by the formula (6)

$$R^8R^9R^{10}Si-O- \qquad (6)$$

wherein $R^8, R^9$ and $R^{10}$ represent independently an alkyl group of 1 to 6 carbon atoms, phenyl group or an alkyl-substituted phenyl group of 7 to 12 carbon atoms; and k represents a value of $1 \leq k \leq 3$, said soluble polyimide-siloxane precursor further being terminated by groups expressed by the following formula (7):

$$Y^2{}_kR^7{}_{3-k}Si- \qquad (7)$$

wherein $Y^2$ independently represents an alkoxy group, acetoxy group, a halogen atom, hydroxyl group or a group expressed by said formula (6); $R^7$ and k are as defined in said formula (5);

and having a percentage imidization a of 50 to 100%, this a being defined in terms of the whole of the molecule by the following equation (8):

$$a = \frac{(2W + P) \times 100}{2W + 2P + 2Q} \quad (\%) \qquad (8)$$

wherein

W: the total number of constituting units expressed by said formula (2);

P: the total number of constituting units expressed by said formula (3) and

Q: the total number of constituting units expressed by said formula (4);

as the whole of the molecule, $2B^1$, $E^1$ and $D^1$ which are respectively the total numbers of $R^4$, $R^5$ and $R^6$ having a relationship expressed by the following expressions (9) and (9'):

$$\frac{B^1(l+1) + D^1}{B^1(l+1) + E^1 + D^1} \geq 0.1 \qquad (9)$$

$$\frac{D^1}{B^1 + E^1 + D^1} \geq 0.1; \text{ and} \qquad (9')$$

and the inherent viscosity of the precursor as measured in a concentration of 0.5 g/dl in a solvent at $30° \pm 0.01°$ C. being in the range of 0.05 to 5 dl/g.

The present invention in a second aspect resides in:

a process for producing a soluble polyimide-siloxane precursor which comprises a first step reaction of reacting A mols of a tetracarboxylic acid dianhydride expressed by the following formula (10), $B^2$ mols of a diaminosiloxane expressed by the following formula (11), $E^2$ mols of a diamine expressed by the following formula (12) and $D^2$ mols of an amino-silicon compound expressed by the following formula (13) in the presence of a solvent at a temperature of 0° C. or higher and lower than 60° C. for a time of 0.2 to 6 hours so as to give a relationship among A, $B^2$, $E^2$ and $D^2$, expressed by the following expressions (14) and (14'), and to approximately satisfy the equation (15), to thereby form a uniform reaction product fluid; and further a second step reaction of heating said reaction product fluid at a temperature of 60° C. or higher and lower than 200° C. for a time of 0.5 to 30 hours, in the presence of F mols of a silylating agent expressed by the following formula (17), which F falls within a range expressed by the following expression (16), to effect an imidization reaction, and hydrolyzing $X^1$ in said aminosilicon compound expressed by the formula (13) and $X^2$ in said silylating agent expressed by the formula (17), with water generated during said imidization reaction and if necessary, water from other sources, and further effecting siloxane condensation, to make the percentage imidization a of the resulting product defined by the following equation (18), 50 to 100%, and also make the inherent viscosity thereof as measured in a solvent in a concentration of 0.5 g/dl at a temperature of $30 \pm 0.01°$ C., 0.05 to 5 dl/g:

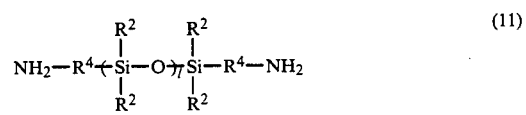

$$NH_2-R^5-NH_2 \qquad (12)$$

$$NH_2-R^6-SiR^7{}_{3-k}X^1{}_k \qquad (13)$$

$$\frac{B^2(l+1) + D^2}{B^2(l+1) + E^2 + D^2} \geq 0.1 \qquad (14)$$

$$\frac{D^2}{B^2 + E^2 + D^2} \geq 0.1 \quad (14')$$

$$2A = 2B^2 + 2E^2 + D^2 \quad (15)$$

$$0 \leq F/(D^2 \times k) \leq 1 \quad (16)$$

$$R^8 R^9 R^{10} SiX^2 \quad (17)$$

wherein $R^1$, $R^2$, $R^4$, $R^5$, $R^6$, $R^7$, $R^8$, $R^9$, $R^{10}$, l and k are as defined above; $X^1$ represents an alkoxy group, acetoxy group or a halogen atom; and $X^2$ represents an alkoxy group acetoxy group, a halogen atom or hydroxyl group, $$a = \frac{(2W + P) \times 100}{2W + 2P + 2Q} \, (\%) \quad (18)$$

wherein W, P and Q are as defined above.

The present invention in a third aspect resides in a cross-linked polyimide-siloxane obtained by heating the above-described soluble polyimide-siloxane precursor to a temperature of 100° to 300° C.

DETAILED DESCRIPTION OF PREFERRED EMBODIMENTS

Figure 1:
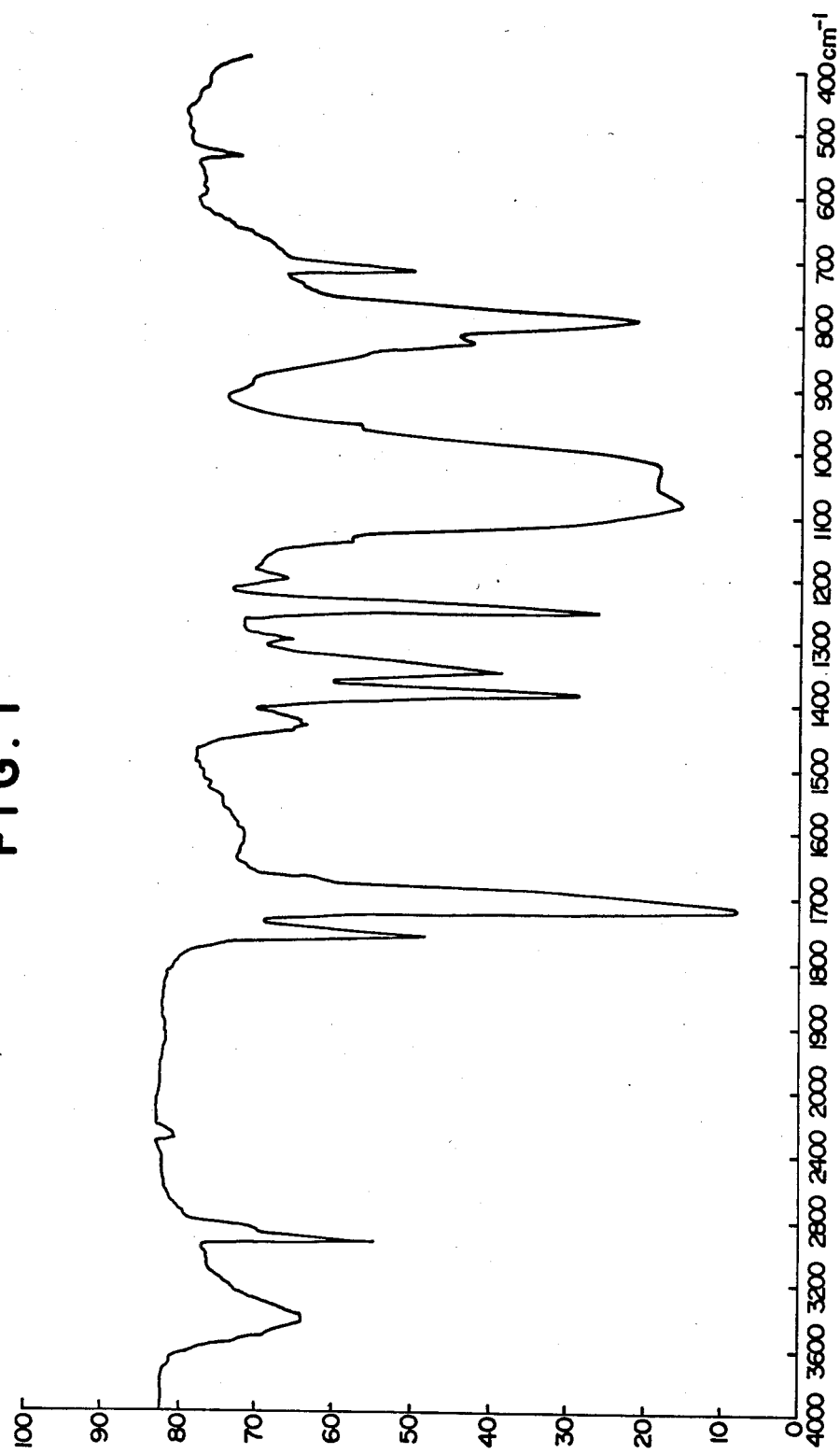
FIG. 1 shows an infrared absorption spectrum chart of a soluble polyimide-siloxane precursor obtained in Example 1 of the present invention.

The soluble polyimide-siloxane precursor of the present invention in the first aspect is an oligomer or polymer having an imide-amic acid chain part expressed by the formula (1) (hereinafter abbreviated often to imideamic acid chain part (1); those expressed by other formulas, often similarly abbreviated), cross-linked or extended through bonding by means of a bonding structure expressed by the formula (5) to form a skeleton, and being terminated with a group expressed by the formula (7).

$R^1$ has preferably at least one six-membered ring. $R^1$ is particularly, monocyclic aryl group, condensed polycyclic aryl group or polycyclic aryl group having a few condensed rings or non-condensed rings (these rings being combined with each other directly or through a cross-linking group). Examples of such cross-linking group is —O—, —CO—, —SO₂—.

Examples of $R^1$ are

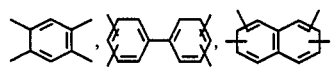

and 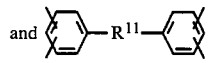

wherein $R^{11}$ represents —O—, —CO— or —SO₂—, and when it has two or more aromatic rings (including condensed ring), the bonds of the respective rings are at o-position to each other.

$R^5$ includes not only an atomic group consisting only of C and H, but a hydrocarbon having a cross-linking group containing a different atom other than

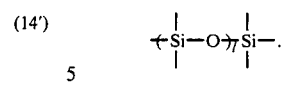

Examples of such a cross-linking group are —O—, —S—, —SO₂—, —CO—,

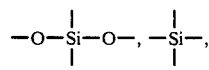

etc.

Examples of $R^5$ are

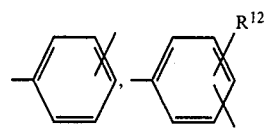

wherein $R^{12}$ represents an alkyl group of 1 to 4 carbon atoms;

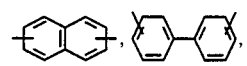

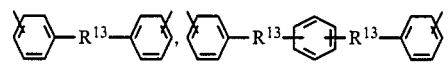

wherein $R^{13}$ represents —O—, —S—, —SO₂—, —CO—, —CH₂— or

$-(CH_2)_p-$ wherein p represents an integer of 2 to 12; and

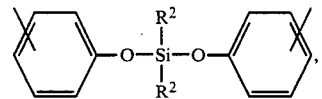

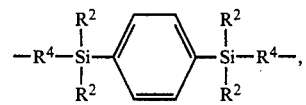

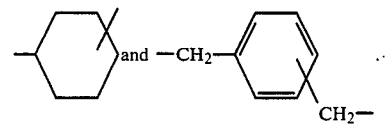

The precursor of the present invention has a suitable range of molecular weight defined in terms of an inherent viscosity of 0.05 to 5 dl/g as measured under specified conditions, and is soluble in a suitable solvent.

The above inherent viscosity ($\eta$ inh) is expressed by the following equation:

$$\eta\ inh = \frac{\ln \eta/\eta_0}{c}$$

wherein $\eta$ is a value measured by Ubbellohde viscometer, of a solution of polymer in a concentration of 0.5 g/dl in a solvent at a temperature of $30\pm0.01°$ C.; $\eta_o$ is a value of the solvent measured by Ubbellohde viscometer at the same temperature; and c is a concentration of 0.5 g/dl.

When the respective total numbers of $R^4$, $R^5$ and $R^6$ in the molecule, of the above imide-amic acid chain part (1) are referred to as $2B^1$, $E^1$ and $D^1$, the Si concentration in the polymer is expressed by these values, and the preferred range is expressed by the expression (9). If the expression (9) is not satisfied, the total number of Si is sometimes reduced and the adhesion lowers. Further, if the expression (9') is not satisfied, the number of cross-linkable, residual group expressed by $Y^1$ in the formula (5) is reduced; hence when a film is prepared, the coating-formability, mechanical strengths, etc. are reduced.

Further, each I in the imide-amic acid chain part (1) independently represents any one of the constituting units (2), (3) or (4), and the percentage imidization a is within a range of 50 to 100% in terms of the whole of the molecule; hence the percentage imidization of the product can be increased in spite of its being a precursor. Thus, for example, it is possible to effect completion of the imidization by heating the precursor at a relatively low temperature and in a relatively short time. The determination of the number of imide groups required for calculating the percentage imidization a may be carried out according to a known infrared absorption spectrum method.

The soluble polyimide-siloxane precursor of the present invention in the first aspect is constituted as described above.

Next, the raw materials of the present invention in the second aspect will be described.

$R^1$ in the tetracarboxylic acid dianhydride expressed by the formula (10) is defined as above.

Examples of the tetracarboxylic acid dianhydride expressed by the formula (10) are as follows:

pyromellitic acid dianhydride, 3,3',4,4'-biphenyltetracarboxylic acid dianhydride, 2,2',3,3'-biphenyltetracarboxylic acid dianhydride, 2,3,3',4'-biphenyltetracarboxylic acid dianhydride, 3,3',4,4'-benzophenonetetracarboxylic acid dianhydride, 2,3,3',4'-benzophenonetetracarboxylic acid dianhydride, 2,2',3,3'-benzophenonetetracarboxylic acid dianhydride, bis(3,4-dicarboxyphenyl)-ether dianhydride, bis(3,4-dicarboxyphenyl)-sulfone dianhydride, 1,2,5,6-naphthalenetetracarboxylic acid dianhydride, 2,3,6,7-naphthalenetetracarboxylic acid dianhydride, etc.

Further, examples of the diaminosiloxane expressed by the formula (11) are as follows:

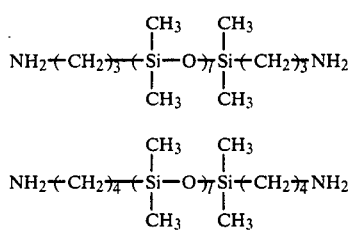

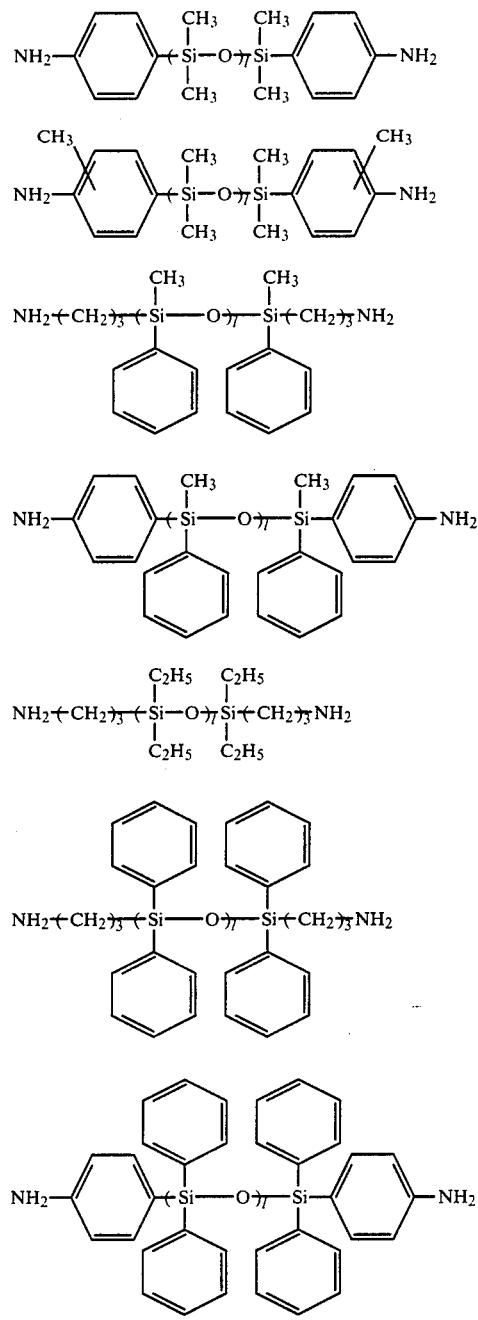

Among these diaminosiloxanes, those wherein l is in the range of 1 to 100 are preferred. If l exceeds 100, the resulting silicone-polyimide precursor has a reduced solubility in solvents; hence such a precursor is not practical.

Next, $R^5$ in the diamine expressed by the formula (12) is defined as above.

Further, examples of the diamine expressed by the formula (12) are as follows:

aryl diamines such as 4,4'-diaminodiphenyl ether, 4,4'-diaminodiphenylmethane, 4,4'-diaminodiphenylsulfone, 4,4'-diaminodiphenylsulfide, 4,4'-diaminodiphenyl thioether, 4,4'-di(m-aminophenoxy)diphenylsulfone, 4,4'-di(p-aminophenoxy)diphenylsulfone, o-phenylenediamine, m-phenylenediamine, p- phenylenediamine, benzidine, 2,2'-diaminobenzophenone, 4,4'-diaminobenzophenone, 4,4'-diaminodiphenyl-2,2'-propane, etc., aliphatic diamines such as trimethylenediamine, tetramethylenediamine, hexamethylenediamine, 4,4-dimethylheptamethylenediamine, 2,11-dodecanediamine, etc., silicic diamines such as bis(p-aminophenoxy)-dimethylsilane, 1,3-bis(3-aminopropyl)-1,1,3,3-tetramethyldisiloxane, 1,4-bis(3-aminopropyl-dimethylsilyl) benzene, etc., alicyclic diamines such as 1,4-diaminocyclohexane and aminoalkyl-substituted aryl compounds such as o-xylylenediamine, m-xylylenediamine, etc.

Next, examples of aminosilicon compounds expressed by the formula (13) are as follows:

$NH_2$—$(CH_2)_3$—$Si(OCH_3)_3$, $NH_2$—$(CH_2)_3$—$Si(OC_2H_5)_3$, $NH_2$—$(CH_2)_3$—$Si(CH_3)(OCH_3)_2$, $NH_2$—$(CH_2)_3$—$Si(CH_3)(OC_2H_5)_2$, $NH_2$—$(CH_2)_3$—$Si(C_2H_5)(O^n$—$C_3H_7)_2$, $NH_2$—$(CH_2)_4$—$Si(OCH_3)_3$, $NH_2$—$(CH_2)_4$—$Si(OC_2H_5)_3$, $NH_2$—$(CH_2)_4$—$Si(CH_3)(OC_2H_5)_3$,

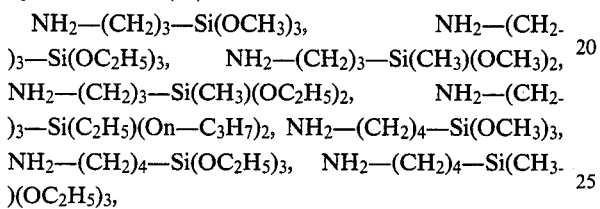

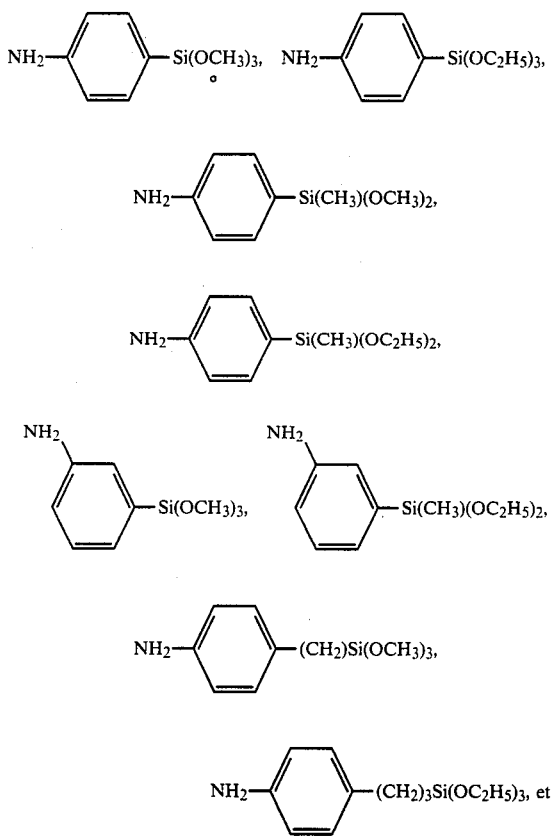

Further, examples of the silylating agent expressed by the formula (17) are as follows:

$(CH_3)_3Si(OCH_3)$, $(CH_3)_3Si(OC_2H_5)$, $(CH_3)_3Si(O^n$—$C_3H_7)_3$, $(CH_3)_2(C_2H_5)Si(OCH_3)$, $(CH_3)_2(C_2H_5)Si(OC_2H_5)$, $(CH_3)_3SiOH$, $(CH_3)_3Si(OCOCH_3)$,

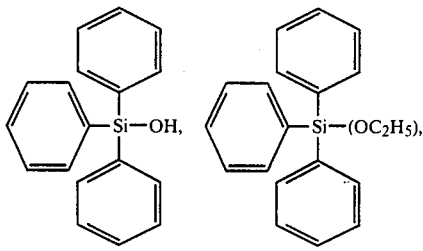

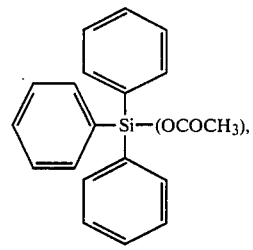

etc.

Examples of preferable solvents for reacting the raw material compounds in a solvent in the process of the present invention (hereinafter referred to as reaction solvent) are as follows:

N-methyl-2-pyrrolidone, dimethylacetamide, dimethylformamide, dimethyl sulfoxide, tetramethylurea, pyridine, dimethyl sulfone, hexamethylphosphoroamide, methylformamide, N-acetyl-2-pyrrolidone, toluene, xylene, ethylene glycol monomethyl ether, ethylene glycol monoethyl ether, ethylene glycol monobutyl ether, diethylene glycol monomethyl ether, diethylene glycol dimethyl ether, cyclopentanone, cyclohexanone, etc. These solvents may be used alone or in admixture, and also may be used in the form of a mixed solvent thereof with other solvents containing 30% by weight or more of the above solvents.

Next, the reaction process will be described.

A mols of a tetracarboxylic acid dianhydride expressed by the formula (10) are reacted with $B^2$ mols of a diamino-siloxane expressed by the formula (11), $E^2$ mols of a diamine expressed by the formula (12) and $D^2$ mols of an aminosilicon compound expressed by the formula (13) in a reaction solvent. A, $B^2$, $E^2$ and $D^2$ are determined so as to satisfy the expressions (14), (14') and also approximately satisfy the equation (15). The expression (14) defines the range where the resulting soluble polyimide-siloxane precursor, when used as a surface-protecting film for semiconductors, can maintain a superior adhesion thereof onto silicon wafer, glass, etc. The expression (14') defines the range where superior coating-formability and mechanical strengths are maintained.

The equation (15) refers to a relationship in the case where the total number of amino groups in the diaminosiloxane, the diamine and the aminosilicon compound are equivalently reacted with the total number of

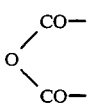

groups in the tetracarboxylic acid dianhydride, but the reaction may not always be just equivalently carried out. For example, if the practical number of mols of (A) falls within the range of the theoretical number of mols of (A) defined by the equation (15)±10%, it is possible to completely obtain the precursor of the present invention in the first aspect. The above terms "approximately satisfy the equation (15)" refers to such a range.

In the process of the present invention, the reaction of the respective raw materials in a solvent is carried out through a first step reaction wherein the tetracarboxylic dianhydride is reacted with the diaminosiloxane, the diamine and the aminosilicon compound at a relatively low temperature, and through a second step reaction wherein after completion of the first step reaction, the resulting reaction fluid (hereinafter referred to often as fluid after completion of the first step reaction) is heated in the presence of a silylating agent at a relatively high temperature to carry out the reaction along with at least the water generated at that time. The quantity of the reaction solvent used is preferably 60% by weight or more based on the total weight of the solvent and raw materials added thereto, since such a quantity makes the agitating operation easy, but 98% by weight or more is unnecessary.

The first step reaction is carried out in the presence of the reaction solvent at a temperature of 0° to 60° C., preferably 3° to 30° C. and for a time of 0.2 to 6 hours. Concretely, the tetracarboxylic acid dianhydride, the diaminosiloxane, the diamine and the aminosilicon compound may be at the same time added to the reaction solvent to react these together and thereby produce a random copolymer, but by selecting the addition order, it is possible to produce a copolymer having a block-like structure. For example, when a tetracarboxylic acid dianhydride is reacted almost equivalently with a diaminosiloxane and an aminosilicon compound, followed by reacting the remaining tetracarboxylic acid dianhydride and diamine almost equivalently with the remaining aminosilicon compound, then two kinds of intermediates completed at the respective steps are obtained. When these intermediates are mixed and subjected to the second step reaction, it is possible to obtain a block-like copolymer having the intermediates bonded with each other. Alternatively, when a tetracarboxylic acid dianhydride is reacted with a diaminosiloxane in a mixing ratio of the tetracarboxylic acid dianhydride in excess, to prepare an oligomer having the anhydrides at both the ends thereof, while, in another reactor, the tetracarboxylic acid dianhydride is reacted with a diamine in a mixing ratio of the diamine in excess, to prepare an oligomer having the amines at both the ends thereof, followed by mixing and reacting both the oligomers, and thereafter reacting an aminosilicon compound at both the ends thereof, it is possible to obtain an intermediate. Besides, by selecting the addition manner at the first step, it is possible to obtain various intermediates.

In this case, there is no particular limitation to the addition order of the above four raw materials, but when the aminosilicon compound is finally added in the respective steps of the first step reaction, then a polymer having a higher molecular weight is liable to be obtained.

In the first step reaction, the above four raw materials dissolve in the solvent and the reaction proceeds relatively rapidly to form a uniform and transparent reaction fluid. At that time the reaction has been almost complete, but it is preferred to further continue the reaction for a while to thereby ensure completion of the reaction. The reaction mainly comprises formation of a polyamide-carboxylic acid having the aminosilicon compounds bonded to both the ends thereof (hereinafter referred to often as intermediate G), as described later.

The second step reaction is directed to a reaction wherein after completion of the first step reaction, the reaction temperature is raised in the presence of a silylating agent expressed by the formula (17) in a quantity of F mols within the range expressed by the expression (16) and the mixture is heated to a temperature of 60° to 200° C., preferably 80° to 130° C. for a time of 0.5 to 30 hours to carry out imidization reaction. Further, $X^1$ of the aminoslicon compounds at both the ends of the intermediate G and $X^2$ of the silylating compound are hydrolyzed with water generated at the imidization reaction and if necessary, water from other sources, and still further, siloxane condensation reaction is carried out. The silylating agent may be added when the second stage reaction is initiated, but alternatively it may be added together with the raw materials in advance of initiating the first step reaction and in this case, there is no substantial influence upon the first step reaction, and further this case is rather preferable since the operation of transferring the reaction from the first step to the second step is easy. The greater the proportion of the diaminosiloxane in the raw materials, or the smaller the k value in the formula (13) (for example, k=2 or less), the slower the advance of the second step reaction. In such a case, it is also possible to carry out the second step reaction without adding any silylating agent. Further, the increase in the proportion of the diamino-siloxane affords a more highly linear polymer as compared with the case where the increase in the silicon content in the polymer as a means for enhancing the adhesion of silicon compounds is relied only on the aminosilicon compound, and also reduces the proportions of $Y^1$ and $Y^2$ which are reactive groups in the polymer chain and hence contributes to the stability of varnishes at the time of their storage.

The second step reaction comprises mainly a reaction wherein the amide-carboxylic acid part in the intermediate G formed in the first step reaction is cyclized to imidize it, as described below, and at the same time, when $X^1$ in the aminosilicon compound forming the terminal of the intermediate G and $X^2$ in the free silylating agent are each a hydrolyzable group, i.e. alkoxy group, acetoxy group or halogen, the half quantity or more of such a hydrolyzable group is hydrolyzed into hydroxyl group (there may often be a case where $X^2$ is initially —OH). There also occurs at least partly between the intermediate Gs themselves, between the intermediate G and the silylating agent or between the silylating agents themselves, a condensation reaction of hydroxyl groups bonded to Si between each other or a condensation reaction of hydroxyl group with hydrolyzable group, to form siloxane bonds (hereinafter referred to often as siloxane condensation reaction).

As to the siloxane condensation of the silylating agent between each other, the silylating agent merely forms an inert compound which is present in dissolved state in the solvent, but other siloxane bonds constitute a reticulate structure or enhance the Si content in the high-molecular compound; hence in the resulting polyimide-siloxane precursor, siloxane bonds in a considerably large quantity are not only formed at the sites of $X^1$ and $X^2$, but also when the precursor is baked, the resulting siloxane bonds are preferred to be formed at the sites of all or nearly all $X^1$ and $X^2$ of Si, and hence it is preferred to hydrolyze $\frac{1}{2}$ or the whole of $X^1$ and $X^2$ to form —OH. Thus, the minimum quantity of water required for such a hydrolysis, that is, the minimum quantity of water required for subjecting the whole of $X^1$ and $X^2$ to the hydrolysis-siloxane condensation is $(D^2 \times k + F) \times \frac{1}{2}$ mols (if $X^2$ is hydroxyl group, the quantity of water is reduced as much).

At least a part of the quantity of water consumed in the hydrolysis is derived from the quantity of water generated when the polyamic acid is imidized. The quantity of water generated is $2A \times a \times (1/100)$ mols wherein a represents the percentage imidization. Thus, in the second step reaction, the quantity of water to be added to the fluid after completion of the first step reaction is preferably $[\{(D^2 \times k + F) \times \frac{1}{2} \sim (D^2 \times k + F)\} - 2A \times a \times (1/100]$ mols, but if the water content in the reaction solvent used is not negligible, it is necessary to take this water content into account. As described above, the quantity of water to be added in the second stage reaction varies depending on the quantity of water generated by the imidization, the water content in the reaction solvent and further the quantity of siloxane bonds, and there may be a case where water addition is unnecessary, depending on the quantity of water generated by the imidization or the water content in the solvent. The silylating agent is used for molecular weight modification in order to prevent that the intermediate G from forming siloxane bonds between each other at both the ends thereof and endlessly developing into a high molecular weight polymer. The expression (16) indicates that the quantity of the silylating agent used, i.e. F mol is 1 or less in terms of $F/(D^2 \times k)$, and it is not always necessary to add the silylating agent in excess of 1.

If the reaction temperature at the second step is lower than 60° C., the reaction is slow and hence such a temperature is not practical. At 60° C. or higher, the reaction can be carried out without any abnormal reaction, but temperatures exceeding 200° C. are unnecessary. A promotor for imidization reaction such as tertiary amines may be added in carrying out the second step reaction, but this is not always necessary since, in the present invention, the water generated by imidization is immediately consumed for hydrolysis to direct the reaction toward imidization and as a result the imidization reaction proceeds rapidly. An acid catalyst or the like for promoting the hydrolysis reaction may be added, but no addition is preferred taking into account its bad influence in the case where it remains.

In the second step reaction, usually it is possible to allow the imidization reaction and the siloxane condensation reaction to proceed smoothly without gelling the reaction fluid, by reacting the silylating agent, and it is also possible to optionally control the viscosity of the reaction fluid i.e. the molecular weight of the precursor, by varying the quantity of the silylating agent used and the reaction conditions within the above ranges, respectively. Thus it is possible to obtain a soluble polyimide-siloxane precursor in the form of oligomer or polymer, having a suitable inherent viscosity of 0.05 to 5 dl/g, soluble in solvents and yet having a percentage imidization of 50% or more. If the inherent viscosity is less than 0.05 dl/g, the coating state of the coating fluid is inferior and hence the coating formation is insufficient. If it exceeds 5 dl/g, the polymer is difficulty soluble or insoluble and hence is difficult to apply to practical use.

As described above, by carrying out the first step reaction followed by the second step reaction, it is possible to obtain a soluble polyimide-siloxane precursor having a percentage imidization of 50% or more and also an inherent viscosity of 0.05 to 5 dl/g.

According to the process of the present invention, even when a polyamide-carboxylic acid having aminosilicon compounds bonded at both the ends thereof (intermediate G) obtained from a tetracarboxylic acid dianhydride, a diaminosiloxane, a diamine and an aminosilicon compound at a low temperature in the first step reaction is heated in the presence of a silylating agent in the second step reaction to effect imidization and at the same time hydrolysis and siloxane condensation reaction, the second step reaction proceeds smoothly without causing gelation. This is because the silylating agent participates in the reaction to effect siloxane condensation, whereby a part of the Si active sites of the intermediate G is inactivated to terminate an endless siloxane condensation of the intermediate G between each other. This fact will be described as follows, referring to reaction equations as an example. In this example, for simplicity of description, $NH_2$—L—$NH_2$ wherein L represents

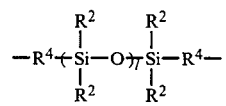

is used as the diaminosiloxane; $NH_2$—$R^6$—$Si(OEt)_3$ wherein OEt represents ethoxy group, is used as the aminosilicon compound; the percentage imidization is made 100%; and $(CH_3)_3Si(OEt)$ is used as the silylating agent.

A tetracarboxylic acid dianhydride is reacted with the diaminosiloxane and the diamine as follows:

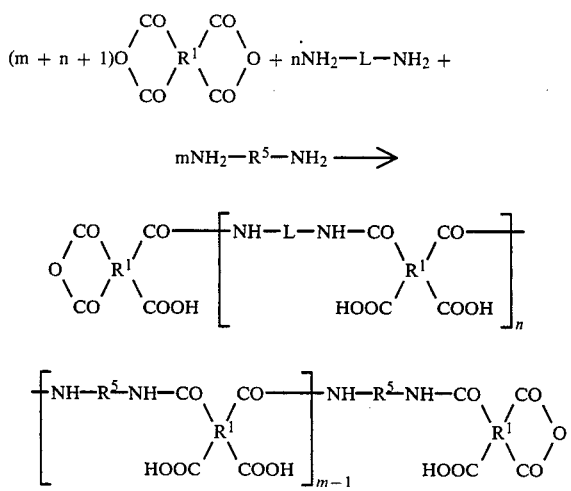

At both the ends of the resulting product, each mol of $NH_2$—$R^6$—$Si(OEt)_3$ reacts to form an intermediate G expressed by the following formula (19):

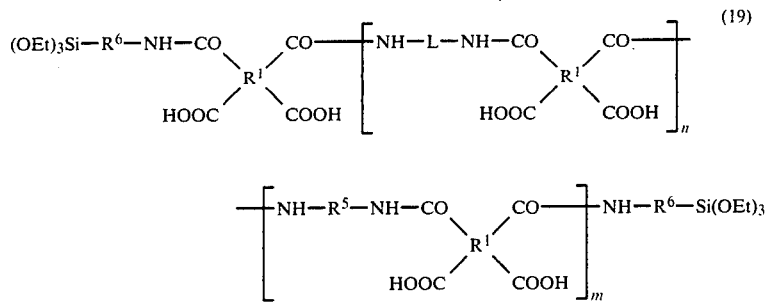

This intermediate G is imidized by heating and at the same time releases water, as shown in the following equation (20):

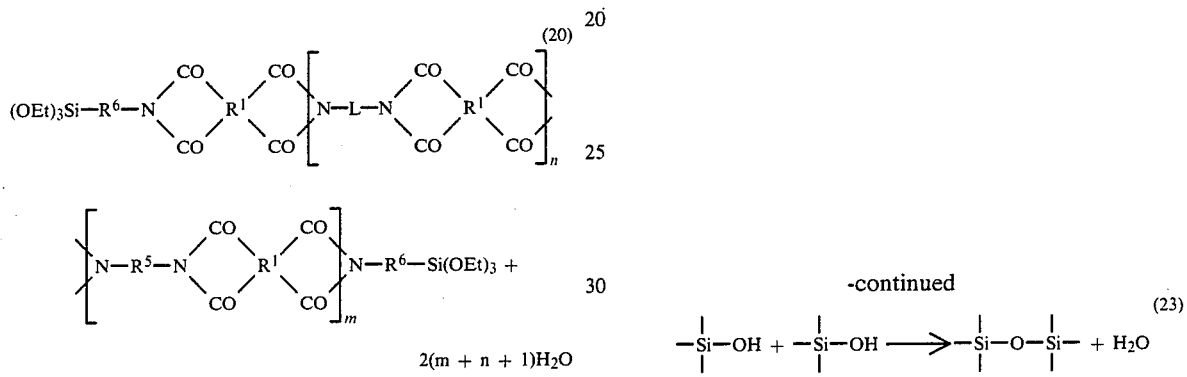

The part enclosed by broken line in the formula (20) will hereinafter be referred to as J.

Water present in the reaction fluid including water formed herein immediately reacts with the whole or a part of Si(OEt)$_3$ at both the ends of a fresh intermediate expressed by the formula (20) to form an intermediate K expressed by the following formula (21):

$$(OEt)_{3-y}(OH)_y Si—R^6—J—R^6—Si(OH)_x(OEt)_{3-x} \qquad (21)$$

wherein x and y each represents 1, 2 or 3.

in an intermediate K formed herein readily causes siloxane condensation reaction with

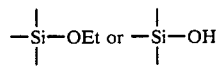

in another intermediate K, as shown in the following equations (22) and (23):

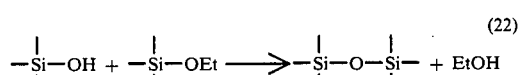

or

-continued

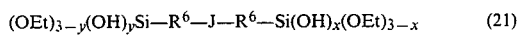

Thus, the intermediate J may be regarded as a monomer having three active sites at each of both the ends thereof (six active sites in total) in this case. Accordingly, if the intermediate K is heated in the absence of the silylating agent, no reaction occurs at a part of the active sites, while siloxane condensation reaction successively occurs at other active sites as shown in the following formula to form a crosslinked structure and also make its molecular weight very high:

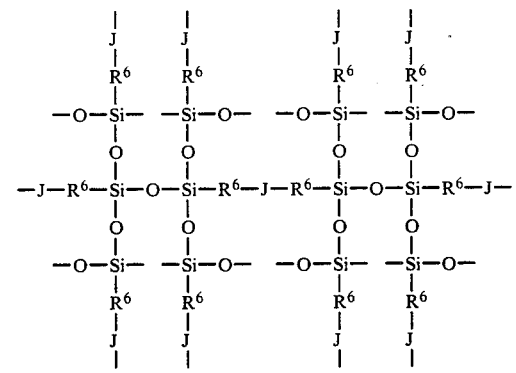

This reaction occurs rapidly to make its control impossible; hence the reaction fluid gels at once.

Whereas according to the process of the present invention, a silylating agent is made present in the second step reaction, whereby a part of the active sites of Si is inactivated for example as shown in the following formula (24):

(24)

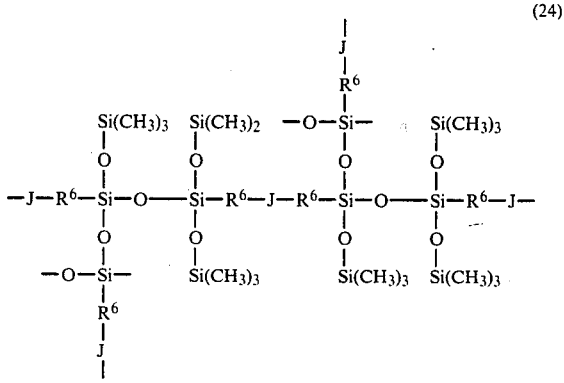

As shown in the above formula, the active sites subjected to siloxane condensation reaction with the silylating agent are inactivated so that the subsequent siloxane condensation reaction is terminated. Thus, the number of crosslinks formed is restricted and also formation of a product with too high a molecular weight is prevented so that the reaction proceeds smoothly without gelling of the reaction fluid.

In addition, as described above, the larger the proportion of the diaminosiloxane in the raw materials (for example, 100%), and the smaller the k value in the formula (13) (for example, 2 or less), and further, the greater the dilution of the raw materials in the reaction solvent, and still further, the relatively lower the temperature of the siloxane condensation reaction, the more smoothly the siloxane condensation reaction can be advanced without causing any gelation even when no silylating agent is added.

The resulting polyimide-siloxane precursor obtained according to the above reaction under adjusted quantity of silylating agent used and reaction conditions, has a percentage imidization already advanced to 50% or more and also a molecular weight as expressed by an inherent viscosity of 0.05 to 5 dl/g; it is soluble in solvents; and it has an enhanced Si content due to the simultaneous use with the diaminosiloxane.

The polyimide-siloxane precursor of the invention(-hereinafter abbreviated often to precursor) can be widely used as precursor for affording protecting materials, insulating materials, adhesives, etc. in the field of electronic equipment or films, structural materials, etc. In most cases, the precursor is used in the form of a solution wherein it is dissolved in a solvent, as in the case of varnishes; hence it is used preferably in a state where the solution obtained according to the process of the present invention is concentrated or diluted with a solvent (such a solution will hereinafter be referred to often as precursor solution). As such a solvent, the same as the reaction solvent may be used. For example, when the precursor solution is used as protecting material for electronic materials, the solution may be, if necessary, freed from ionic substances by means of solid adsorbent or the like and further freed from minute solid impurities by means of a filter of 1 μm or less, and the resulting solution may be used as a coating fluid. The concentration of such a coating fluid is determined depending on the thickness of coating required. It is preferably 40% by weight or less, and a range of 0.3 to 25% by weight is often particularly preferable for practical use. The coating fluid is uniformly coated on silicon wafer, glass, etc. by means of spinner or the like in a conventional manner, followed by heating. The heating conditions somewhat vary depending on the solvent used, the thickness of coating, etc., but those of a relative short time of about 0.5 to 1.5 hours and a temperature of 100° to 300° C. may be sufficient. By such heating, the percentage imidization of the precursor which is less than 100% reaches 100%; the precursor having a not yet so large molecular weight and being soluble in solvents increases in the number of crosslinks through siloxane bonds to form a solvent-insoluble, endlessly reticulate structure, and the transparent, pale-yellow color of the precursor solution turns, e.g. to a transparent, brown color (but pale-yellow to colorless in the case of a thin product of several μms or less, thick) to form a very hard and highly heat-resistant substance; hence the precursor can be utilized as protecting materials in the field of electronic equipment.

The precursor obtained according to the process of the present invention, when used as a liquid crystal aligning agent, exhibits good results.

The soluble polyimide-siloxane precursor of the present invention has a suitable inherent viscosity and hence its solution has a suitable viscosity so that it is possible to carry out coating well. Heating of the precursor is carried out for imidizing a remaining unimidized part and also for completing siloxane condensation reaction at unreacted active sites; hence a relatively low temperature and a relatively short time may be sufficient for heating. Further, the presence of a high Si content and hence a large quantity of siloxane bonds imparts to the precursor a good coating-formability on and a strong adhesion to silicon wafer, glass, etc. having Si or Si compound, and the crosslinking to a suitable extent reinforces the siloxane bond which is liable to become soft.

Production of the polyimide-siloxane having such various performances is effected by heating the intermediate G obtained at the first step, to a high temperature in the presence of water and if necessary, a silylating agent at the second step.

Further, the precursor of the present invention is suprior in the storage stability of its solution, due to the siloxane chain originating from the diaminosiloxane as raw material.

The present invention will be described in more detail by way of Examples, Comparative examples and Use tests:

EXAMPLE 1

A 1 l flask equipped with stirrer, dropping funnel, thermometer, condenser and nitrogen gas-purging means was fixed in cold water. Into the flask purged with nitrogen gas were fed dewatered, purified cyclohexanone (500 ml), ω,ω'-bis(3-aminopropyl)polydimethylsiloxane (84.79 g, 0.0833 mol) expressed by the formula (11) wherein l=11.6, 3-aminopropyltriethoxysilane (36.88 g, 0.167 mol) and trimethylethoxysilane (2.96 g, 0.0250 mol), followed by dissolving together these materials with stirring, and gradually feeding to the resulting solution, powdery pyromellitic acid dianhydride (36.33 g, 0.167 mol) through the dropping funnel over 30 minutes and continuing reaction, during which the reaction temperature was 3° to 10° C. The reaction was further continued at the temperature for 2 hours, followed by raising the temperature to effect the 25° to 30° C. for 2. hours. This first step reaction formed a pale-yellow, transparent fluid having a rotational viscosity at 25° C. of 26 cp. This rotational viscosity referred to herein means a viscosity measured at 25° C. using an E type viscometer (VISCONIC EMD, manufactured by Tokyo Keiki Company) (this definition will be applied to the following). Next the temperature of the reaction fluid was further raised and reaction was carried out at 100° C. for 4 hours (the second step reaction) to obtain a pale-brown, transparent fluid having a rotational viscosity at 25° C. of 65 cp, that is, a solution of a soluble polyimide-siloxane precursor. A portion of this precursor solution was taken and dried at room temperature under reduced pressure to obtain a pale-brown, solid precursor having a percentage imidization of 95% or more, as determined by its infrared absorption spectra, and the precursor had an inherent viscosity of 0.11 dl/g in cyclohexanone as solvent.

When the precursor solution was kept at a temperature of 5~10° C. for 30 days, the resulting rotational viscosity at 25° C. was 67 cp, and a very good storage stability was exhibited. FIG. 1 shows the infrared absorption spectrum chart of the precursor obtained in this Example 1. It is observed from FIG. 1 that the absorption spectra of imide group (5.63 $\mu$m and 13.85 $\mu$m) are clearly present while the absorption spectrum of amidic acid (N-H band 3.08 $\mu$m) is extinct.

EXAMPLE 2

Using the same apparatus and process as in Example 1, $\omega,\omega'$-bis(3-aminopropyl)polydimethylsiloxane (49.82 g, 0.0810 mol) expressed by the formula (11) wherein l=5.96, 3-aminopropylmethyldiethoxysilane (10.33 g, 0.0540 mol) and trimethylethoxysilane (0.64 g, 0.00540 mol) were dissolved in cyclohexanone (500 ml), followed by adding to the solution, pyromellitic acid dianhydride (23.54 g, 0.108 mol) over 30 minutes while keeping the solution at 3~10° C., and carrying out reaction at the temperature for 2 hours and further at 30~35° C. for one hour to obtain a uniform solution. After completion of the first step reaction, the temperature of the resulting fluid was raised and the second step reaction was carried out at 110° C. for 12 hours. As a result, a pale brown, transparent solution of a polyimidesiloxane precursor having a rotational viscosity at 25° C. of 120 cp was obtained. This precursor had an inherent viscosity of 0.34 dl/g and the percentage imidization was 95% or more. The precursor solution exhibited a very good storage stability.

COMPARATIVE EXAMPLE 1

Using the same apparatus and process as in Example 1, $\omega,\omega'$-bis(3-aminopropyl)polydimethylsiloxane (87.46 g, 0.142 mol) expressed by the formula (11) wherein l=5.96 was dissolved in cyclohexanone (500 ml), followed by adding pyromellic acid dianhydride (31.02 g, 0.142 mol) to the solution over 30 minutes while keeping the solution at 3~10° C., carrying out reaction at the temperature for 2 hours and further at 30° C. for 12 hours to obtain a pale yellow uniform solution having a rotational viscosity at 25° C. of 22 cp. When this solution was heated to 100° C. for imidization, the viscosity lowered rapidly to give an oligomer solution having a rotational viscosity of 5 cp as measured at 25° C.

EXAMPLE 3

Using the same apparatus and process as in Example 1, $\omega,\omega'$-bis(3-aminopropyl)polydimethylsiloxane (2.68 g, 0.00436 mol) expressed by the formula (11) wherein l=5.96, diaminodiphenyl ether (12.22 g, 0.0610 mol), 3-aminopropyltriethoxysilane (9.65 g, 0.0436 mol) and trimethylethoxysilane (1.29 g, 0.0109 mol) were dissolved in N-methyl-2-pyrrolidone (400 ml) and ethylene glycol mcnobutyl ether (100 ml), followed by adding pyromellitic acid dianhydride (19.01 g, 0.0872 mol) to the solution over 30 minutes while keeping the solution at 0~5° C., carrying out reaction at the temperature for one hour and further at 20~25° C. for 3 hours to obtain a uniform solution. The temperature of the solution after the first step reaction was raised and reaction was carried out at 100° C. for 11 hours to effect the second step reaction. As a result, a brown transparent solution of a polyimide-siloxane precursor having a rotational viscosity at 25° C. of 216 cp. This precursor had an inherent viscosity of 1.3 dl/g and the percentage imidization was 86%. The solution of the precursor exhibited a good storage stability.

EXAMPLE 4

Using the same apparatus and process as in Example 1, 1,3-bis(3-aminopropyl)-1,1,3,3-tetramethyldisiloxane (1.50 g, 0.00604 mol), diaminodiphenyl ether (9.67 g, 0.0483 mol), 3-aminopropyltrimethoxysilane (2.16 g, 0.0121 mol) and trimethylmethoxysilane (0.31 g, 0.00298 mol) were dissolved in N-methyl-2-pyrrolidone (500 ml), followed by adding benzophenonetetracarboxylic acid dianhydride (19.45 g, 0.0604 mol) to the solution over 30 minutes while keeping the solution at 10~15° C., carrying out reaction at the temperature for 2 hours and further at 45~50° C. for one hour, to obtain a uniform solution. The temperature of this solution after completion of the first step reaction was further raised and reaction was carried out at 90° C. for 13 hours to complete the second step reaction. As a result, a pale brown transparent solution of a polyimide-siloxane precursor having a rotational viscosity at 25° C. of 970 cp was obtained. This precursor had an inherent viscosity of 2.7 dl/g, and the percentage imidization was 65%. The solution of the precursor exhibited a good storage stability.

EXAMPLE 5

Using the same apparatus and process as in Example 1, $\omega,\omega'$-bis (3-aminopropyl)polydimethylsiloxane (51.98 g, 0.0845 mol) expressed by the formula (11) wherein l=5.96, 4,4'-diaminodiphenylmethane (4.19 g, 0.0211 mol) and p-aminophenyltrimethoxysilane (9.01 g, 0.0422 mol) were dissolved in a mixed solvent of N-methyl-2-pyrrolidone (250 ml) and ethylene glycol monobutyl ether (250 ml), followed by adding benzophenonetetracarboxylic acid dianhydride (40.85 g, 0.127 mol) to the solution over 30 minutes while keeping the solution at 0~5° C., and carrying out reaction at the temperature for one hour and further at 20~25° C. for 4 hours to obtain a uniform solution.

The temperature of the solution after the first step reaction was raised and reaction was carried out at 120° C. for 2 hours, to obtain a brown transparent solution of a polyimide-siloxane precursor having a rotational viscosity at 25° C. of 83 cp.

This precursor had an inherent viscosity of 0.20 dl/g and the percentage imidization was 95% or more. The precursor solution exhibited a very good storage stability.

EXAMPLE 6

Using the same apparatus and process as in Example 1, ω,ω'-bis(3-aminopropyl)polydimethylsiloxane (99.23 g, 0.0177 mol) expressed by the formula (11) wherein l=73.3, 3-aminopropyltriethoxysilane (7.838 g, 0.0354 mol) and trimethylsilyl acetate (1.64 g, 0.0124 mol) were dissolved in cyclohexanone (500 ml), followed by adding benzophenonetetracarboxylic acid dianhydride (11.42 g, 0.0354 mol) to the solution over 30 minutes while keeping the solution at 10~15° C., and carrying out reaction at the temperature for one hour and further at 50~55° C. for 2 hours to obtain a uniform solution, adding water (0.32 g, 0.0178 mol) to the solution after the first step reaction, raising the temperature and carrying out reaction at 100° C. for 5 hours to effect the second step reaction. As a result, a pale yellow solution of a polyimide-siloxane precursor having a rotational viscosity at 25° C. of 360 cp was obtained.

This precursor had an inherent viscosity of 0.53 dl/g and the percentage imidization was 95% or more. The precursor solution exhibited a very good storage stability.

EXAMPLE 7

Using the same apparatus and process as in Example 1, 4,4'-diaminodiphenyl ether (15.42 g, 0.0770 mol) was dissolved in N,N-dimethylacetamide (500 ml), followed by adding benzophenonetetracarboxylic acid dianhydride (37.21 g, 0.116 mol) to the solution over 30 minutes while maintaining the solution at 15~20° C., carrying out reaction at the temperature for one hour, thereafter adding 1,3-bis(3-aminopropyl)-1,1,3,3-tetramethyldisiloxane (9.57 g, 0.0385 mol) to the solution, further adding, after 30 minutes, benzophenonetetracarboxylic acid dianhydride (12.42 g, 0.039 mol) over 30 minutes, carrying out reaction at the temperature for one hour, successively adding 3-aminopropyltriethoxysilane (17.05 g, 0.0770 mol) and trimethylethoxysilane (2.28 g, 0.0193 mol), carrying out reaction at 30~35° C. for one hour to obtain a uniform solution, raising the temperature of this solution after the first step reaction and carrying out reaction at 100° C. for 8 hours to effect the second step reaction.

As a result, a pale brown solution of a polyimide-siloxane precursor having a rotational precursor at 25° C. of 330 cp was obtained. This precursor had an inherent viscosity of 0.36 dl/g and the percentage imidization was 95% or more. This precursor solution exhibited a good storage stability.

COMPARATIVE EXAMPLE 2

Using the same apparatus and process as in Example 1, 1,3-bis(3-aminopropyl)-1,1,3,3-tetramethyldisiloxane (5.34 g, 0.0215 mol) and 4,4'-diaminodiphenyl ether (38.70 g, 0.193 mol) were dissolved in N-methyl-2-pyrrolidone (500 ml), followed by adding pyromellitic acid dianhydride (46.85 g, 0.215 mol) to the solution over 30 minutes while keeping the solution at 10~15° C., and carrying out reaction at the temperature for 2 hours and further at 45~50° C. for one hour to obtain a pale yellow uniform solution having a rotational viscosity at 25° C. of 420 cp. When this solution was heated to 90° C. for imidization, the viscosity lowered rapidly, and after 3 hours, an oligomer solution having a rotational viscosity of 9 cp as measured at 25° C. was obtained.

COMPARATIVE EXAMPLE 3

Using the same apparatus and process as in Example 1, 3-aminopropyltriethoxysilane (52.83 g, 0.239 mol), 4,4'-diaminodiphenyl ether (23.89 g, 0.119 mol) and trimethylethoxysilane (10.60 g, 0.0896 mol) were dissolved in N-methyl-2-pyrrolidone (500 ml), followed by adding pyromellitic acid dianhydride (52.05 g, 0.239 mol) to the solution over 30 minutes while keeping the solution at 3~8° C., carrying out reaction at the temperature for 2 hours and further at 25~30° C. for one hour to obtain a pale yellow uniform solution having a rotational viscosity at 25° C. of 23 cp, thereafter further raising the temperature of this reaction solution, and carrying out reaction at 120° C. for 9 hours to obtain a pale yellow transparent solution of a soluble polyimide-siloxane precursor having a rotational viscosity at 25° C. of 130 cp. This precursor had a percentage imidization of 95% or higher and an inherent viscosity of 0.13. The precursor solution was kept at a temperature of 5~10° C. for 30 days. The resulting rotational viscosity at 25° C. increased to 240 cp.

EXAMPLE 8

The following coating-heating test was carried out: The solutions of the polyimide-siloxane precursor obtained in Examples 1~7 and the final reaction solutions obtained in Comparative examples 1 and 2 were used as coating solution. These solutions were filtered through a filter of 1 μm, followed by applying them onto a glass plate by means of a spinner, heating to 150° C., 200° C. or 250° C. for 2 hours to observe the condition of the resulting coatings. The results are shown in Table 1.

TABLE 1

| Test No. | Coating solution | Heating temperature | | |
|---|---|---|---|---|
| | | 150° C. | 200° C. | 250° C. |
| | Example | | | |
| 1 | 1 | o | o | o |
| 2 | 2 | o | o | o |
| 3 | 3 | o | o | o |
| 4 | 4 | o | o | o |
| 5 | 5 | o | o | o |
| 6 | 6 | o | o | o |
| 7 | 7 | o | o | o |
| | Comp. ex. | | | |
| 8 | 1 | x | x | x |
| 9 | 2 | x | x | x |

(Note)
o: Coating was uniformly formed and had a practically sufficient hardness.
x: Coating was not uniformly formed.

EXAMPLE 9

The following adhesion test was carried out:
Various coating solutions shown in Table 2 were applied onto the surface of a slide glass by means of a spinner and heated to 150° C., 200° C. or 250° C. for 2 hours to form coatings of 1~2 μm thick, followed by treating them for 4 hours in a constant temperature and constant humidity chamber kept at 90° C. and a relative humidity of 95%, notching the resulting coatings, into small pieces of a square having sides of 2 mm, applying a cellophane tape onto the surface thereof, and just thereafter peeling off the tape. The adhesion was expressed in terms of the number of small pieces of coatings peeled off at that time together with the cellophane tape per 100 small pieces prior to peeling off.

The results are shown in Table 2.

TABLE 2

| Test No. | Coating solution | Heating temperature | | |
|---|---|---|---|---|
| | | 150° C. | 200° C. | 250° C. |
| | Example | | | |
| 1 | 1 | 0 | 0 | 0 |
| 2 | 2 | 0 | 0 | 0 |
| 3 | 3 | 0 | 0 | 0 |
| 4 | 4 | 0 | 0 | 0 |
| 5 | 5 | 0 | 0 | 0 |
| 6 | 6 | 0 | 0 | 0 |
| 7 | 7 | 0 | 0 | 0 |
| 8 | Reference ex.* | 100 | 100 | 100 |

*A varnish of a polyamidecarboxylic acid which is a conventional polyimide precursor prepared from pyromellitic acid dianhydride and 4,4'-diamino-diphenyl ether.
Solvent: N—methyl-2-pyrrolidone.
Concentration of solids: 18%.
Rotational viscosity at 25° C.: 1,050 cp.

As seen from the results of Tables 1 and 2, the precursor of the present invention forms a coating having a sufficient strength and adhesion even when the heating conditions carried out after applying its solution are a low temperature (150° C.) and a short time (2 hours).

What we claim is:

1. A soluble polyimide-siloxane precursor having an imide-amic acid chain part expressed by the formula (1)

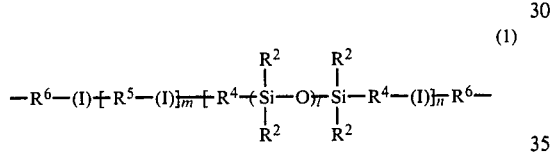

bonded by a bonding structure expressed by the formula (5)

$$-SiR^7{}_{3-k}Y^1{}_{k-1}-O-SiR^7{}_{3-k}Y^1{}_{k-1}- \quad (5)$$

wherein each I, in a total number of m+n+1, represents independently any one of constituting units expressed by the following formulas (2), (3) and (4):

wherein
$R^1$ represents independently a tetravalent carbocyclic aromatic group;
each $R^2$ represents independently an alkyl group of 1 to 6 carbon atoms, phenyl group or an alkyl-substituted phenyl group of 7 to 12 carbon atoms;
each $R^4$ and each $R^6$ represents independently —CH$_2$—$_s$,

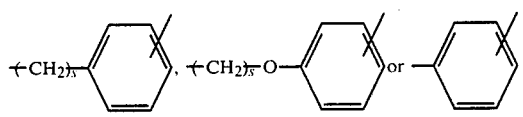

wherein s represents an integer of 1 to 4;
$R^5$ represents an aliphatic group of 2 to 12 carbon atoms, an alicyclic group of 4 to 30 carbon atoms, an aromatic aliphatic group of 6 to 30 carbon atoms or a carbocyclic aromatic group of 6 to 30 carbon atoms;
l represents an integer of 1 to 100;
m represents zero or a positive integer;
n represents a positive integer;
each $R^7$ represents independently an alkyl group of 1 to 6 carbon atoms, phenyl group or an alky-substituted phenyl group of 7 to 12 carbon atoms;
each $Y^1$ represents independently an alkoxy group, acetoxy group, a halogen atom, hydroxyl group, (—O—)$_{\frac{1}{2}}$ or a group expressed by the formula (6)

$$R^8R^9R^{10}Si-O- \quad (6)$$

wherein $R^8$, $R^9$ and $R^{10}$ represent independently an alkyl group of 1 to 6 carbon atoms, phenyl group or an alkyl-substituted phenyl group of 7 to 12 carbon atoms; and
k represents a value of $1 \leq k \leq 3$,
said soluble polyimide-siloxane precursor further being terminated by groups expressed by the following formula (7):

$$Y^2{}_kR^7{}_{3-k}Si- \quad (7)$$

wherein each $Y^2$ independently represents an alkoxy group, acetoxy group, a halogen atom, hydroxyl group or a group expressed by said formula (6); $R^7$ and k are as defined in said formula (5);
and having a percentage imidization a of 50 to 100%, this a being defined in terms of the whole of the molecule by the following equation (8):

$$a = \frac{(2W + P) \times 100}{2W + 2P + 2Q} \, (\%) \quad (8)$$

wherein
W: the total number of constituting units expressed by said formula (2);
P: the total number of constituting units expressed by said formula (3) and
Q: the total number of constituting units expressed by said formula (4);
as the whole of the molecule, $2B^1$, $E^1$ and $D^1$ which are respectively the total numbers of $R^4$, $R^5$ and $R^6$ having a relationship expressed by the following expressions (9) and (9'):

$$\frac{B^1(l+1) + D^1}{B^1(l+1) + E^1 + D^1} \geq 0.1 \quad (9)$$

$$\frac{D^1}{B^1 + E^1 + D^1} \geq 0.1; \text{ and} \quad (9')$$

the inherent viscosity of the presursor as measured in a concentration of 0.5 g/dl in a solvent at 30°±0.01° C. being in the range of 0.05 to 5 dl/g.

2. A process for producing a soluble polyimide-siloxane precursor which comprises a first step reaction of reacting A mols of a tetracarboxylic acid dianhydride expressed by the following formula (10), $B^2$ mols of a diaminosiloxane expressed by the following formula (11), $E^2$ mols of a diamine expressed by the following formula (12) and $D^2$ mols of an aminosilicon compound expressed by the following formula (13) in the presence of a solvent at a temperature of 0° C. or higher and lower than 60° C. for a time of 0.2 to 6 hours so as to give a relationship among A, $B^2$, $E^2$ and $D^2$, expressed by the following expressions (14) and (14'), and to approximately satisfy the equation (15), to thereby form a uniform reaction product fluid; and further a second step reaction of heating said reaction product fluid at a temperature of 60° C. or higher and lower than 200° C. for a time of 0.5 to 30 hours, in the presence of F mols of a silylating agent expressed by the following formula (17), which F falls within a range expressed by the following expression (16), to effect an imidization reaction, and hydrolyzing $X^1$ in said aminosilicon compound expressed by the formula (13) and $X^2$ in said silylating agent expressed by the formula (17), with water generated during said imidization reaction and if necessary, water from other sources, and further effecting siloxane condensation, to make the percentage imidization a of the resulting product defined by the following equation (18), 50 to 100%, and also make the inherent viscosity thereof as measured in a solvent in a concentration of 0.5 g/dl at a temperature of 30±0.01° C., 0.05 to 5 dl/g:

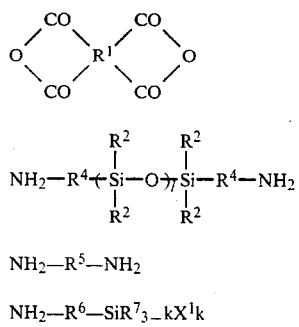    (10)

$$NH_2-R^4 + Si-O_{\overline{n}} Si-R^4-NH_2 \quad (11)$$
(with $R^2$ substituents)

$$NH_2-R^5-NH_2 \quad (12)$$

$$NH_2-R^6-SiR^7{}_{3-k}X^1{}_k \quad (13)$$

$$\frac{B^2(l+1) + D^2}{B^2(l+1) + E^2 + D^2} \geq 0.1 \quad (14)$$

$$\frac{D^2}{B^2 + E^2 + D^2} \geq 0.1 \quad (14')$$

$$2A = 2B^2 + 2E^2 + D^2 \quad (15)$$

$$0 \leq F/(D^2 \times k) \leq 1 \quad (16)$$

$$R^8 R^9 R^{10} SiX^2 \quad (17)$$

wherein $R^1$ represents a tetravalent carbocyclic aromatic group; each $R^2$ represents independently an alkyl group of 1 to 6 carbon atoms, phenyl group or an alkyl-substituted phenyl group of 7 to 12 carbon atoms; each $R^4$ and each $R^6$ represents $-CH_{2s}$,

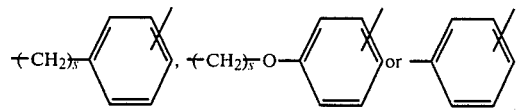

wherein s represents an integer of 1 to 4; $R^5$ represents an aliphatic group of 2 to 12 carbon atoms, an alicyclic group of 4 to 30 carbon atoms, an aromatic aliphatic group of 6 to 30 carbon atoms or a carbocyclic aromatic group of 6 to 30 carbon atoms; $R^7$ represents an alkyl group of 1 to 6 carbon atoms, phenyl group or an alkyl-substituted phenyl group of 7 to 12 carbon atoms; $R^8$, $R^9$ and $R^{10}$ each represent an alkyl group of 1 to 6 carbon atoms, phenyl group or an alkyl-substituted phenyl group of 7 to 12 carbon atoms; l represents an integer of 1 to 100; k represents a value of $1 \leq k \leq 3$; $X^1$ represents an alkoxy group, acetoxy group or a halogen atom; and $X^2$ represents an alkoxy group, acetoxy group, a halogen atom or hydroxyl group, $$a = \frac{(2W + P) \times 100}{2W + 2P + 2Q} \quad (\%) \quad (18)$$

wherein:
W: the total number of constituting units expressed by the following formula (2);
P: the total number of constituting units expressed by the following formula (3) and
Q: the total number of constituting units expressed by the following formula (4):

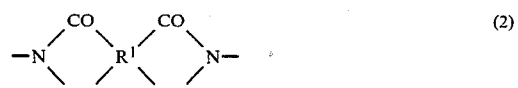    (2)

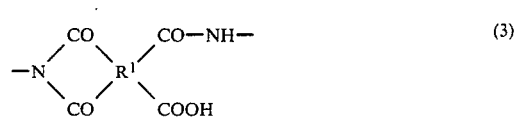    (3)

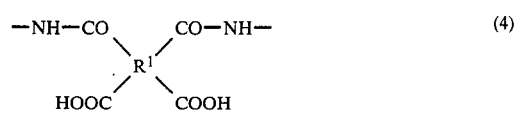    (4)

wherein R' is as defined above.

3. A process for producing a soluble polyimide-siloxane precursor according to claim 2 wherein said second step reaction is carried out by adding water in addition to water generated during said reaction.

4. A cross-linked polyimide-siloxane obtained by heating a soluble polyimide-siloxane precursor obtained according to claim 1 to a temperature of 100° to 300° C.

5. A cross-linked polyimide-siloxane according to claim 4 wherein said heating is carried out for a time of 0.5 to 1.5 hours.

* * * * *